Figure 1:
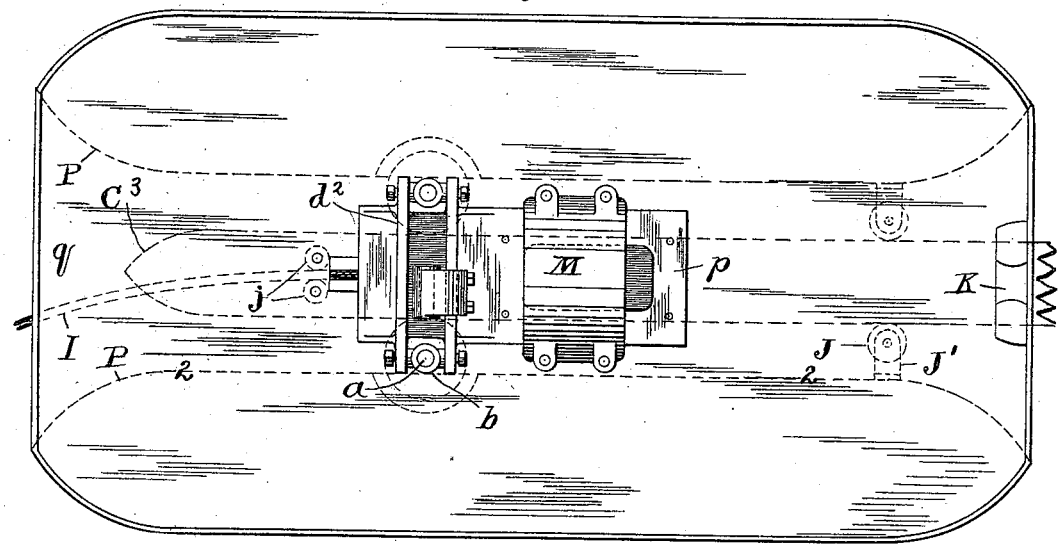

(No Model.) 3 Sheets—Sheet 1.

T. P. MILLIGAN.
FLOATING TRACTION DEVICE.

No. 575,488. Patented Jan. 19, 1897.

Attest:
L. Lee.
Edw. F. Kinsley.

Inventor.
Thomas P. Milligan
per Thomas S. Crane, Atty.

THE NORRIS PETERS CO., PHOTO-LITHO., WASHINGTON, D. C.

(No Model.) 3 Sheets—Sheet 2.
T. P. MILLIGAN.
FLOATING TRACTION DEVICE.
No. 575,488. Patented Jan. 19, 1897.
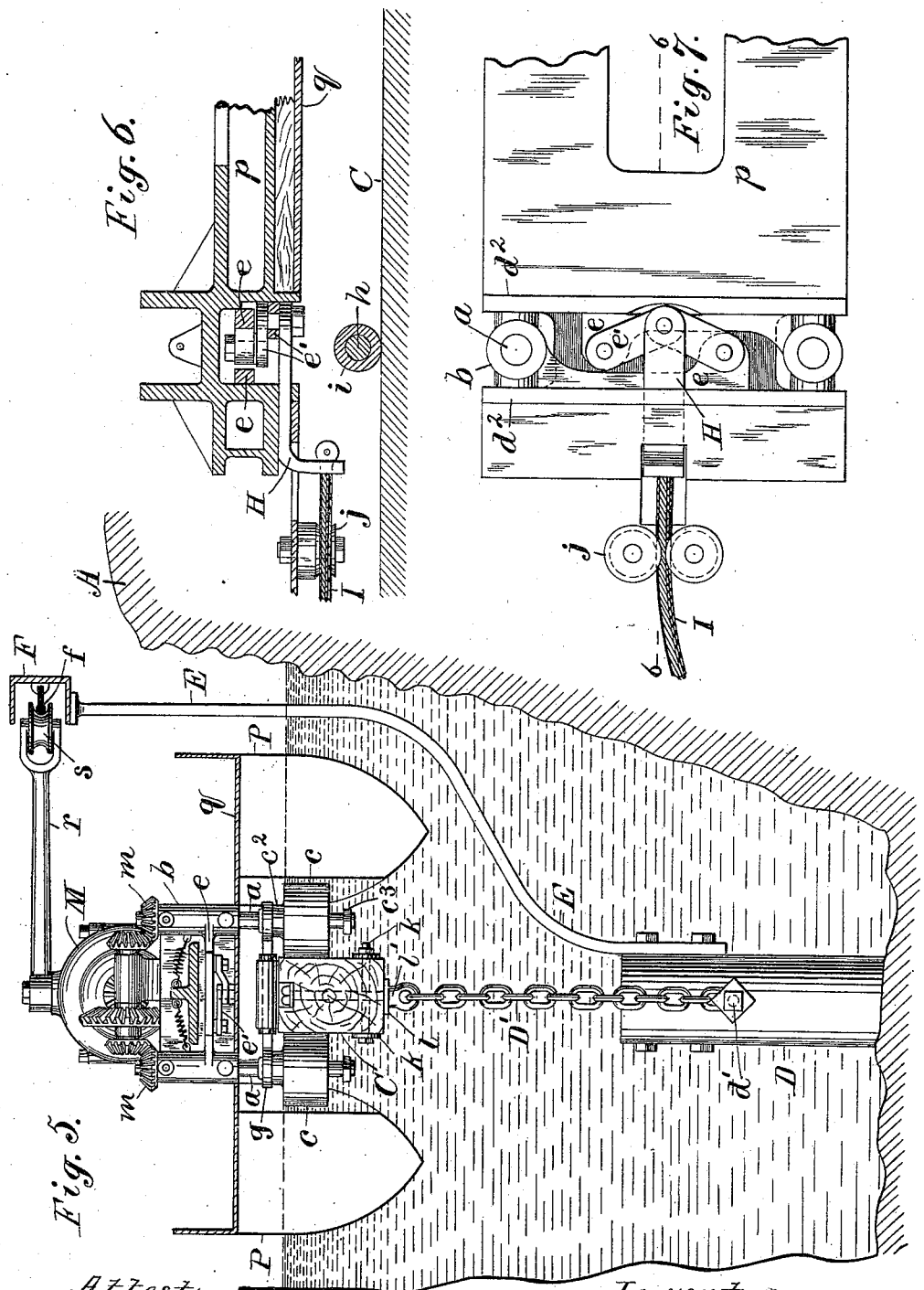
Attest:
L. Lee.
Edw. P. Kinsey.
Inventor.
Thomas P. Milligan, per
Thomas S. Crane, Atty.

(No Model.) 3 Sheets—Sheet 3.
T. P. MILLIGAN.
FLOATING TRACTION DEVICE.
No. 575,488. Patented Jan. 19, 1897.
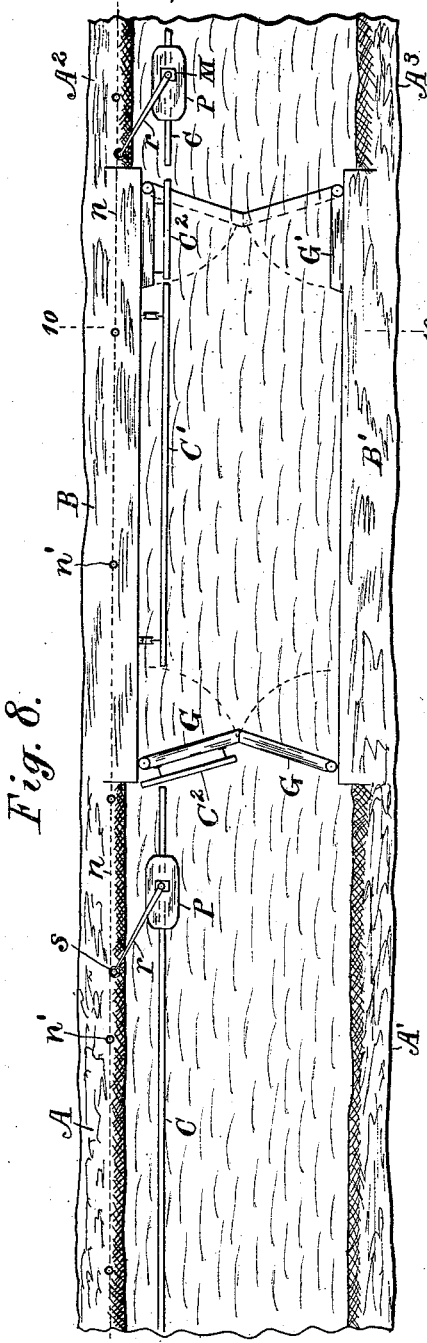
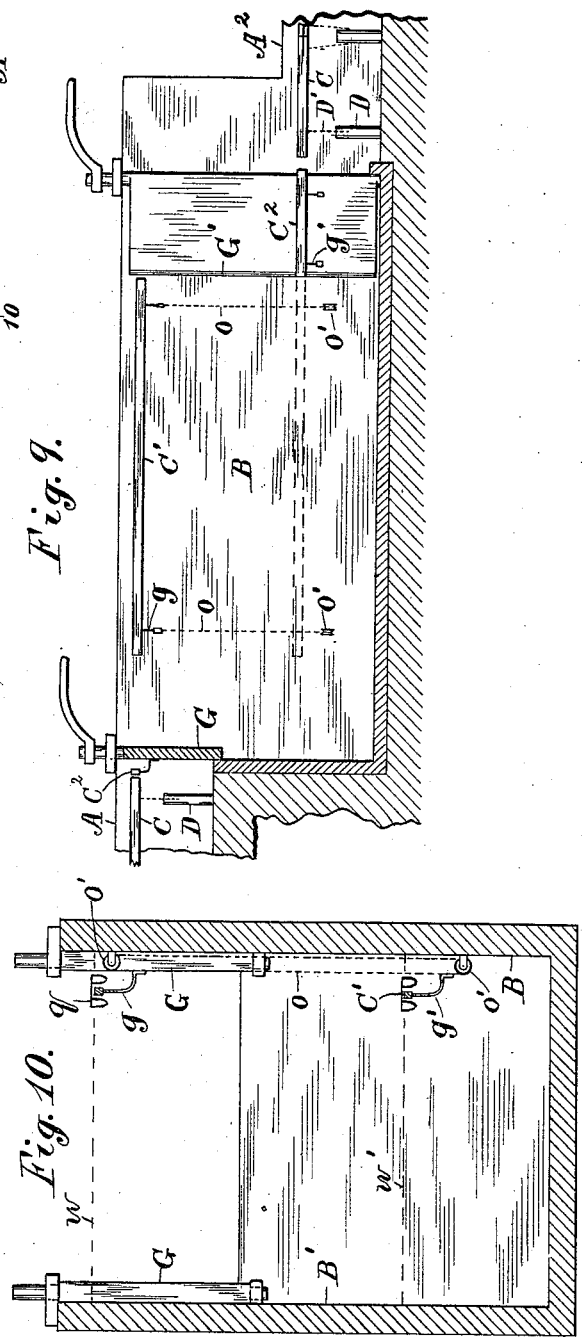
Attest:
Edw. F. Kinsley.
Jacob Marx.
Inventor
Thomas P. Milligan, per
Thomas S. Crane, Atty.

UNITED STATES PATENT OFFICE.

THOMAS P. MILLIGAN, OF CAMBRIDGE, MARYLAND.

FLOATING TRACTION DEVICE.

SPECIFICATION forming part of Letters Patent No. 575,488, dated January 19, 1897.

Application filed March 26, 1896. Serial No. 584,922. (No model.)

*To all whom it may concern:*

Be it known that I, THOMAS P. MILLIGAN, a citizen of the United States, residing at Cambridge, county of Dorchester, State of Maryland, have invented certain new and useful Improvements in Floating Traction Devices, fully described and represented in the following specification and the accompanying drawings, forming a part of the same.

The present invention relates to sundry improvements in the electric-motor system and traction device patented to me with No. 549,522 on November 12, 1895, and it is adapted to be arranged to float upon the surface of the water in a canal or other waterway. The present invention is, however, adapted for the use of various traction devices and is not therefore limited to that shown in my said patent.

In my present construction the traction-rail is preferably made of wooden beams spliced together to furnish a continuous support for the friction-wheels of the towing device and is secured to piles or anchors by chains or flexible connections which hold the rail normally at a short distance from the canal-bank while they permit it to yield when in collision with a boat and also enable it to rise and fall with the variations of level in the water.

An electric motor is preferably used to propel the traction or towing device and is preferably supported upon a catamaran, with a hull floating upon each side of the rail, the shafts of the friction-wheels being projected through the deck of the catamaran to press the friction-wheels upon opposite sides of the rail. By mounting the motor and traction-wheels upon a boat it is readily floated across any gap in the rails, transferred through the locks, and conveyed across basins or analogous bodies of water with which canals are frequently connected.

A trolley-wire may be sustained by brackets upon the piles or traction-rail and may thus be held at a suitable distance along the side of the rail without the expense of a line of supports upon the bank, a spring trolley-arm compensating for any variations in the movement of the rail by changes in the water-level.

For towing canal-boats through a lock I provide a vertically-movable section of the rail upon one side of the lock and short sections of such rail upon the gates of the lock at suitable levels to connect the rails in the canal with the rail in the lock when the gates are open.

These improvements will be understood by reference to the annexed drawings, in which—

Figure 3:
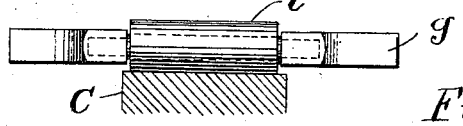
Figure 4:
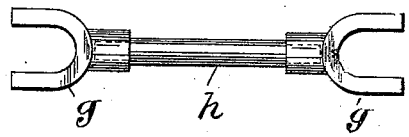
Figure 2:
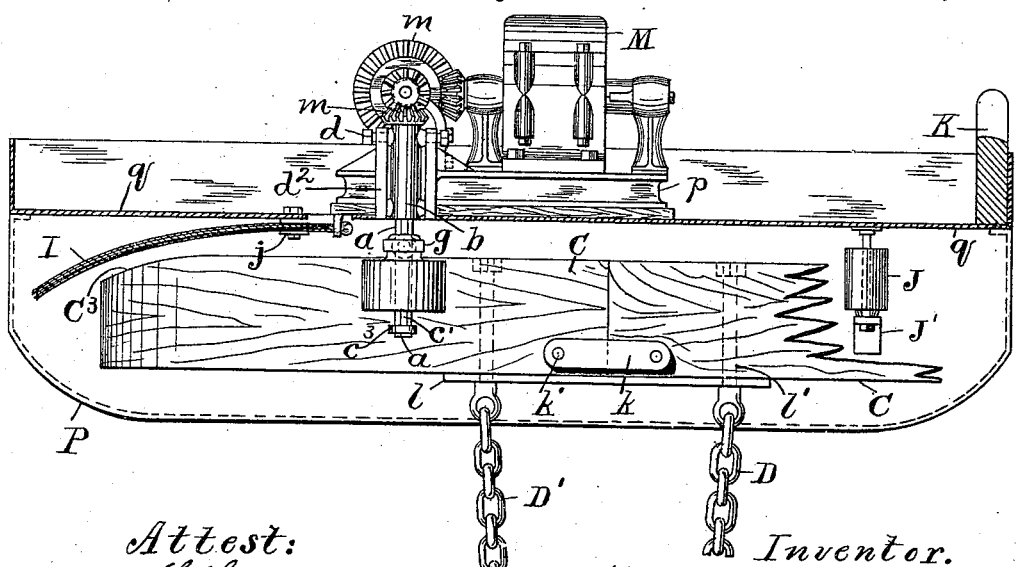

Figure 1 is a plan of the towing device with a motor and gripping-wheels of the construction shown in my said Patent No. 549,522. The gearing for the friction-wheels is omitted from Fig. 1 of the drawings to expose the other parts more clearly to view. Fig. 2 is a side elevation of the towing device with the nearer hull of the catamaran removed and the deck in section on line 2 2 in Fig. 1. Fig. 3 is a section of the top of the rail with an elevation of the roll and fixtures for sustaining the friction-wheels; and Fig. 4 is a plan of the said fixtures, both these figures being drawn upon twice the scale of the previous figures. Fig. 5 is an end elevation, (upon the same scale as Fig. 3,) of the traction device with a section of one of the canal-banks and one of the piles. Fig. 6 is a longitudinal section on line 6 6 in Fig. 7, which shows the under side of the motor-bed to exhibit the draw-bar for the tow-rope and its toggle connections to the friction-wheel bearings. Figs. 6 and 7 are drawn upon the same scale as Figs. 3 and 4. Fig. 8 is a plan of a part of a canal and a lock in the same, with the gates closed at the upper end of the lock. Fig. 9 is a vertical section of the lock at the center line, and Fig. 10 is a cross-section of the lock on line 10 10 in Fig. 8 drawn upon twice the scale of that figure.

Referring to Fig. 8, A A' designate the opposite banks of a canal upon an upper level, and A² A³ the banks upon a lower level, a lock having walls B B' being shown between the two levels, with gates G at the upper end of the lock and gates G' at the lower end. A floating rail C is shown adjacent to the banks A A², and a section C' of a similar rail is shown adjacent to the wall B of the lock. Rail-sections C² are shown affixed by brackets *g* to the lock-gates adjacent to the rail C, the gates G showing the position of the rail when the lock is closed and the gates G' showing the position of such rail when the gates are opened, the section C² then lying intermediate to the sections C and C' and serving to connect the same, although their ends are not in contact. The connection is effected by supporting the towing device upon a boat, which supports the same in its transfer from one section of the rail to another and is adapted to float the same across any break in the rail or across a basin or other body of water unprovided with a rail.

The boat is preferably made as a catamaran, so that one hull may ride upon each side of the rail, with the motor upon the deck between the same, as shown in Figs. 1, 5, and 11.

In Fig. 5 the canal-bank A is shown with a pile D adjacent to the same and the rail C connected thereto by a chain D'.

Fig. 2 shows a joint of the rail-beams tied together by splice-plates $k$ and $l$, with bolts $k'$ and $l'$ extended through the beams, the latter bolts being provided with eyes to attach the ends of the chains D'. The two chains thus connected are readily secured to the top of a single pile by a single bolt, as $d'$ in Fig. 5, and each side of the joint is thus supported independently if it is strained by the contact of a canal-boat.

The series of beams form a continuous rail throughout a canal-section of any length and is anchored by the flexible connections to piles at suitable intervals, as fifteen or twenty feet. The chain holds the rail in approximately the same position whether the water is higher or lower, while its flexibility permits the rail to yield laterally if accidentally pressed by the canal-boat.

The catamaran is shown with two hulls P, connected by a deck $q$, upon which the frame $p$ of the traction device is supported. A bracket E is shown upon the pile, supporting above the level of the catamaran a rectangular box F, with one side open and the trolley-wire $f$ insulated within the same.

An electric motor M (shown in Figs. 2 and 5) is connected by gearing $m$, like that shown in my Patent No. 549,522, with two friction-wheel shafts $a$, which are carried in movable bearings $b$. The shafts are projected below the deck P and are provided at their lower ends with frictional clamping-wheels $c$ to press upon the opposite vertical sides of the rail C.

The bearings $b$ are pivoted at the top by set-screws $d$ between cheeks $d^2$ and are provided each with a lug $e$, to which is pivoted a toggle-link $e'$.

The toggle-links are connected with a draw-bar H, to which the tow-rope I is attached, the tension of the rope operating to draw the bearings $b$ together, so as to clamp the wheels $c$ upon the rail, as described in my aforesaid patent.

Lateral guide-wheels $j$ are shown at opposite sides of the tow-rope to avoid straining the draw-bar when the rope is pulled at various angles with the rail. Vertically-pivoted rolls J are shown in Figs. 1 and 2 mounted in brackets J' upon the hulls of the catamaran and carried adjacent to the sides of the rail, thus operating, in conjunction with the friction-wheels $c$, to hold the boat parallel with the rail. This construction enables the boat and the friction-wheels to be cleared entirely from the rail and to be propelled in any direction by a scull inserted in an oar-lock K, Figs. 1 and 2, at one end of the boat. The extreme ends of the rails are tapered off, as shown at $C^3$ in Figs. 1 and 2, so that the towing device may be applied to such rail end by guiding the wheels $c$ and rolls J upon opposite sides of the rail, as shown in Fig. 1.

Where the traction device is supported by a floating boat and liable to rise and fall with ripples in the water, the friction-wheels $c$ are made to move longitudinally upon the shafts $a$ and provided with fixtures to sustain them at a uniform level upon the rail. The wheels $c$ are fitted to splines $c'$ upon the shafts and provided each with a grooved hub $c^2$, which is embraced by a clutch-fork $g$. (Shown in Figs. 3 and 4.) The clutch-forks are open at their outer ends, and thus permit the wheels to move outwardly and inwardly in gripping the beam when actuated by their movable bearings $b$. The clutch-forks are screwed by suitable sockets upon the opposite ends of a roll-spindle $h$, carrying a roll $i$, which rests upon the top of the rail, as shown in Figs. 2 and 3. The roll and shaft thus support the friction-wheels $c$ upon the top of the rail and permit the shafts $a$ to slide vertically through the wheels when the boat rises or falls with the driving-gear. Collars $c^3$ are applied to the lower ends of the shafts to sustain the wheels $c$ when the traction device is floated off from the rail, the wheels $c$ being lifted from the collars by the clutch-forks when the device is again run upon the rail, and the roll $i$ rides upon the upper surface of the same.

A trolley-pole $r$ is shown in Fig. 5 extended from the top of the motor with wheel $s$ pressed upon the wire, and thus furnishes the requisite current to the electric motor.

An alternative construction is shown in Fig. 8, where the trolley-wheel is shown pressed against a trolley-wire $n$, which is supported upon the bank A by poles $n'$ at suitable intervals; but it will be understood that the piles may furnish corresponding supports without any additional expense, as is illustrated in Fig. 5.

From the above description it will be seen that the floating rail preserves its position upon the surface of the water at various changes of level, so that it may be readily gripped by a traction device which is supported upon a boat, and that the use of a floating rail within the lock, in connection with a similarly-supported rail in the two levels of the canal, permits a towing device upon a boat to be readily transferred from one portion of the rail to another. Where a boat is used for this purpose, its construction and the mode of applying the traction device to grip the rail is immaterial, but I prefer the construction shown in the drawings, where a catamaran is used astride of the rail and having the shafts of the friction-wheels projected through its deck to press the wheels upon the sides of the rail.

My construction furnishes a cheap and thoroughly practicable apparatus for towing canal-boats in the canal and through the locks, and also across lakes and other bodies of water of such a depth that the rail may be anchored therein.

Having described my invention and a means for operating the same, it will be seen that the function of the rail is to afford a stable resistance for the gripping or driving wheels. It is therefore obvious that the scope of the invention is not limited to the specific floating rail illustrated or to any particular mode of placing or securing the rail, nor is the material of the rail at all essential.

Having thus set forth the nature of my invention, what I claim herein is—

1. In a towing device, a rail adjacent to the surface of the water, a boat carrying a suitable motor, a traction device connected with the motor and provided with rolls arranged to grip the rail, and a suitable connection for towing the load, substantially as herein set forth.

2. A towing device comprising a rail adjacent to the surface of the water, a series of spiles suitably connected to the rail to hold it in an operative position, a boat carrying a suitable motor, a traction device operated thereby and having rolls to grip the rail, and a suitable connection for towing the load, substantially as herein set forth.

3. In a towing device, a rail adapted to float upon the water, a boat carrying a suitable motor, and a traction device connected with the motor and arranged and operated to grip the rail, as and for the purpose set forth.

4. In a towing device, a rail adapted to float upon the water, a catamaran-boat with a hull floating upon each side of the rail, a suitable motor upon the deck of the catamaran, and wheels projected below the deck to grip the floating rail, as and for the purpose set forth.

5. In a towing device, a rail adapted to float upon the water, a catamaran-boat with a hull floating upon each side of the rail, a suitable motor upon the deck of the catamaran, vertical shafts driven by the motor and projected below the deck of the same with wheels to press the opposite sides of the rail, and auxiliary guide-wheels between the catamaran and rail, to aline the catamaran therewith, substantially as herein set forth.

6. In a towing device, a rail adapted to float upon the water, an electric motor with driving-wheels arranged to grip the said rail, a trolley-wire sustained adjacent to the rail, and a trolley-wheel and connections from the same to the motor, substantially as herein set forth.

7. A rail adapted to float upon the water, a boat carrying an electric motor with driving-wheels arranged to grip the said rail, a trolley-wire sustained adjacent to the rail, and a trolley-wheel and connections from the floating motor to the said trolley-wheel, substantially as herein set forth.

8. A towing device comprising a rail adapted to float upon the water, a series of spiles with flexible connections to the said rail, an electric motor with driving-wheels arranged to grip the said rail, a trolley-wire sustained by brackets upon the said spiles and a trolley-wheel and connections from the floating motor to the said trolley-wheel, substantially as herein set forth.

9. A canal, having a floating wooden rail with a series of flexible anchor connections holding the same movably adjacent to the side of the canal, a boat carrying a suitable motor and a traction device operating upon the said rail, substantially as herein set forth.

10. The means for towing in a canal, consisting of a floating rail, with a series of flexible anchor connections holding the said rail movably adjacent to the side of the canal, a boat carrying a suitable motor, a traction-motor having wheels to grip the said rail, and a tow-rope for hauling the load, substantially as herein set forth.

11. The means for towing, in a canal having a lock in the same, consisting of a floating rail adjacent to the side of the canal, a continuation of such rail sustained within the lock, and a traction-motor having wheels to grip the said rail, and a tow-rope for hauling the load, substantially as herein set forth.

12. The means for towing, in a canal having a lock in the same consisting of a floating rail adjacent to the side of the canal, a continuation of such rail sustained within the lock, with means for guiding it vertically as the water is drawn from the lock, and sections of the said rail secured to the adjacent leaves of the lock-gates, with a traction-motor having wheels to grip the said rail and a tow-rope for hauling the load, substantially as herein set forth.

In testimony whereof I have hereunto set my hand in the presence of two subscribing witnesses.

THOMAS P. MILLIGAN.

Witnesses:
L. LEE,
THOMAS S. CRANE.